United States Patent [19]
Mulder et al.

[11] 3,827,224
[45] Aug. 6, 1974

[54] DEVICE COMPRISING AT LEAST ONE RAKE MEMBER ADAPTED TO ROTATE ABOUT AN UPWARDLY EXTENDING AXIS

[76] Inventors: Herman Mulder, 17, Gaelstraat, Wateringen; Jan Huibert Leonard Philomena Van Pol, 16,'s Prinsensingel; Berend Hakkeling, 19, Kon. Julianaweg, both of Maasland, all of Netherlands

[22] Filed: Nov. 6, 1972

[21] Appl. No.: 303,689

[52] U.S. Cl. ............................................... 56/370
[51] Int. Cl. ............................................ A01d 79/00
[58] Field of Search...................... 56/365, 370, 400

[56] References Cited
UNITED STATES PATENTS
| | | | |
|---|---|---|---|
| 3,559,389 | 2/1971 | Van Der Lely et al............... | 56/370 |
| 3,648,448 | 3/1972 | Maugg................................. | 56/370 |
| 3,664,106 | 5/1972 | Maugg................................. | 56/370 |

*Primary Examiner*—Robert Peshock
*Assistant Examiner*—J. N. Eskovitz
*Attorney, Agent, or Firm*—Mason, Mason & Albright

[57] ABSTRACT

A raking device has one or more rotary rakes with tines that work crop by rotating in a circular path close to the ground. The tines are mounted in groups on radial spokes and are movable to another working position and/or a transport position by being pivoted relative to the rotary axis of the rake about a pivot connection. A displaceable guide member can be connected to the rear of the frame by a pivotal linkage. The guide member or another displaceable weighted mass is mounted on the frame and interconnected to the tines so that the displacement of the mass acts to pivot the tines from one position to another. An adjusting rod connects the tines to the rotary axis to afford a working setting of the position of the tines.

49 Claims, 10 Drawing Figures

DEVICE COMPRISING AT LEAST ONE RAKE MEMBER ADAPTED TO ROTATE ABOUT AN UPWARDLY EXTENDING AXIS

The invention provides a simple, automatic tine adjustment so that the position of the tines matches the operational state of the rake member or of the device with which the rake member is associated.

According to the invention means are provided by which the tines can be moved from the working position into the transport position and/or conversely and-/or pivotal shaft of the groups of tines extends substantially radial.

For a better understanding of the invention and to show how the same may be carried into effect, reference is made by way of example to the accompanying drawings.

Figure 1:
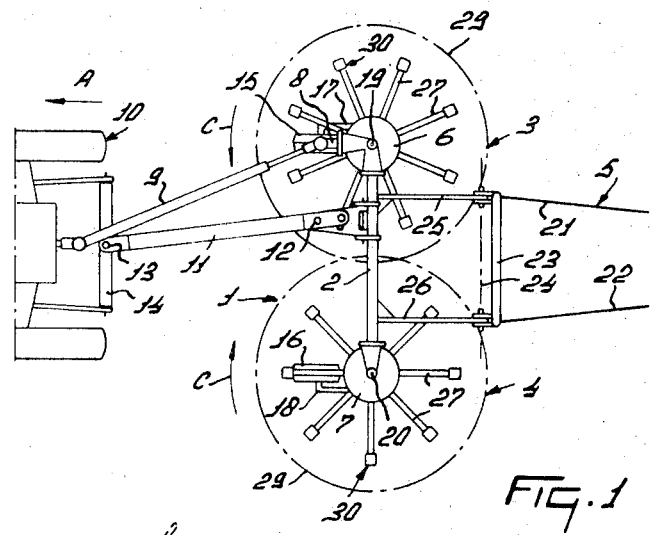
FIG. 1 is a schematic plan view of a machine embodying the invention.

The hay-making machine shown schematically in FIG. 1, in this case a spinning hay-machine, comprises a horizontal frame beam 2, extending transversely of the direction of movement A, two rake wheels 3 and 4, secured to the ends of the frame beam 2 and adapted to rotate about upwardly extending rotary shafts 3 and 4, and a device 5 for the formation of a swath. The rake wheels 3 and 4 are journalled in gear boxes 6 and 7 respectively. The gear box 6 comprises an input axis 8, which drives in known manner the rake wheel 3 with the aid of driving mechanism arranged in the gear boxes 6 and 7 and also the rake wheel 4 via a coupling axis arranged in the hollow frame beam 2. The input axis 8 can be driven by an auxiliary axis 9, which in turn can be rotated by the power take-off shaft of the tractor 10 propelling the machine. Between the ends of the frame beam 2 a drawbar 11 extends to the front, which is adapted to be turned about an upwardly extending pivotal axis 12 with respect to the frame beam 2 and to be fixed in a plurality of positions. The front side of the drawbar 11 is connected with a towbar 14 of the tractor 10 so as to be pivotable about an approximately vertical pivotal axis 13. Apart from this structure the machine may be provided with a trestle (not shown) located, on plan, in front of the rake wheels 3 and 4 and rigidly or pivotally coupled with the frame beam 2 and being suitable for hitching the machine to the three-point lift of the tractor 10, instead of being provided with the drawbar 11.

The drawn machine shown in FIG. 1 comprises furthermore an upwardly adjustable caster wheel 15 and 16 respectively, said ground wheels being connected by means of jib arms 17 and 18 respectively with axes 19 and 20 respectively, arranged around the rotary axes of the rake wheels 3 and 4. The guide member 5 for the formation of a swath comprises two upwardly extending, rearwardly converging guide partitions 21 and 22, which may be interconnected at the front by a connecting element 23. The partitions 21 and 22 and the element 23 are, in common freely pivotable about a pivotal axis 24, extending parallel to the center line of the frame beam 2. For this purpose the partitions 21 and 22 are pivoted to supporting beams 25 and 26 respectively, which extend approximately horizontally away from the frame beam 2 to the rear and which are rigidly secured to said frame beam 2. The hinged connections may comprise bearings and pins, which allow a pivotal movement about the pivotal axis 24. The partitions 21 and 22 and the element 23 can be tilted in common, in this embodiment, about the pivotal axis 24 so that after a turn of about 180° they bear on the top side of the frame beam 2.

Each rake wheel 3 and 4 comprises a plurality — in the embodiment of FIG. 1 eight — outwardly, for example, radially projecting spokes 27, which are adapted to rotate in common around the rotary axis of the rake wheel. At its outermost end each spoke is provided with a group of tines 28 (FIG. 2 to 5), but alternatively it may have only one tine. The orbit described by the free ends of the outermost tines of each group in the working position is designated by 29 for the two rake wheels 3 and 4. On plan the tine paths of the two rake wheels may overlap each other and the arrangement is such that the lowermost point of each of the tine paths 29 viewed in the direction of movement A, is located in front of the point of intersection of the rotary axis of the rake wheels 3 and 4 with the ground.

The tines of all groups of the rake wheels 3 and 4 can be moved from the working positions in which the tines are orientated outwardly and/or inclined downwardly into a transport position in which all tines are displaced relatively to the working position (and at the same time relatively to the further part of the rake wheel) so that the maximum diameter of each rake wheel is smaller than that in the working position. In the transport position the diameter of each rake wheel is considerably smaller than the effective diameter, that is to say smaller than 85 percent of the maximum outer diameter in the working position, but preferably it is about 70 percent of the latter value. It is desirable for the adjustment from the transport position to the working position and conversely to be performed fully automatically for all tines. The means employed for this purpose in accordance with the invention and arranged on each spoke 27 are designated by 30 in FIG. 1. Various embodiments of said means 30 will be described hereinafter.

Figure 2:
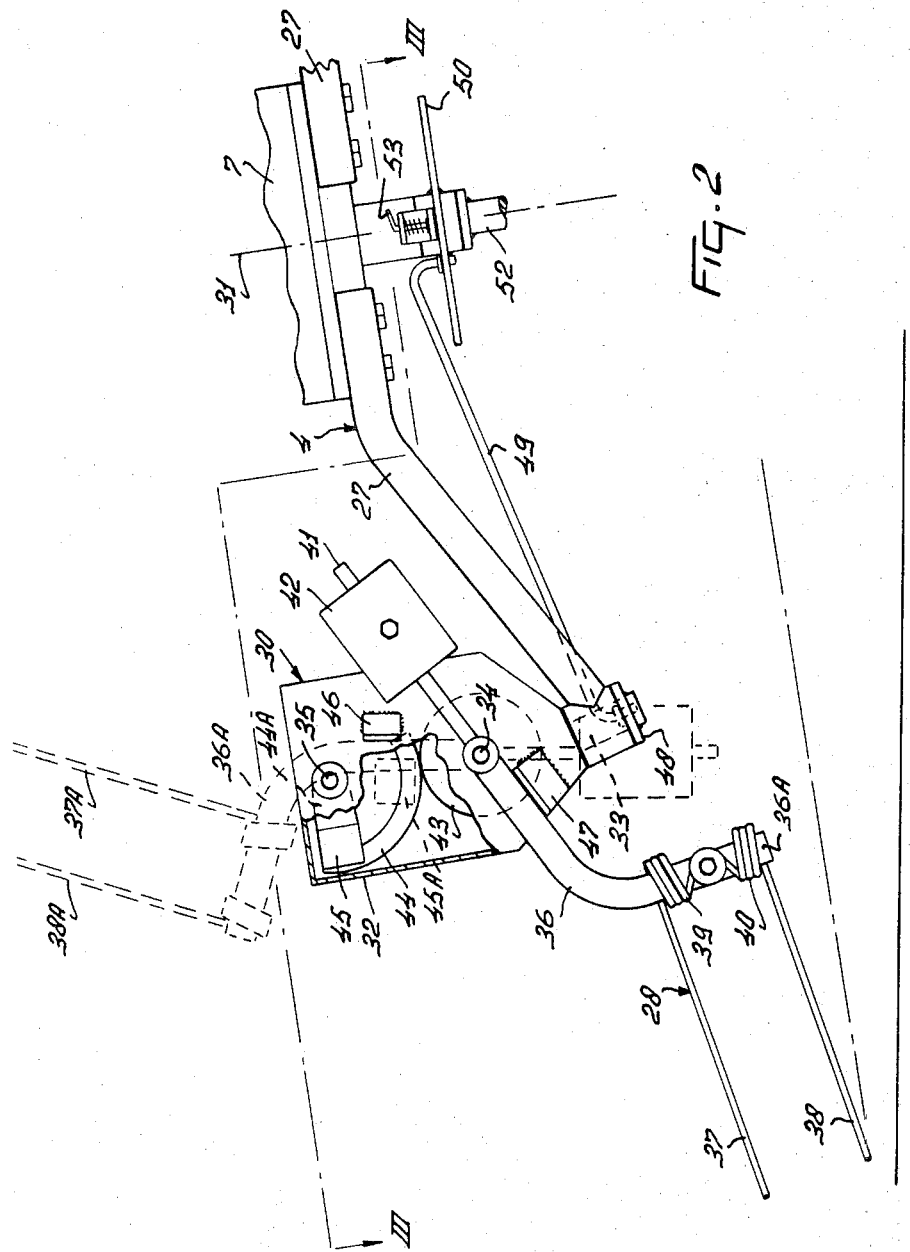
FIG. 2 is an enlarged elevation of a first embodiment of an automatic adjusting device for the tines, viewed in a horizontal direction at right angles to a spoke pointing forwardly in the direction of movement.
Figure 3:
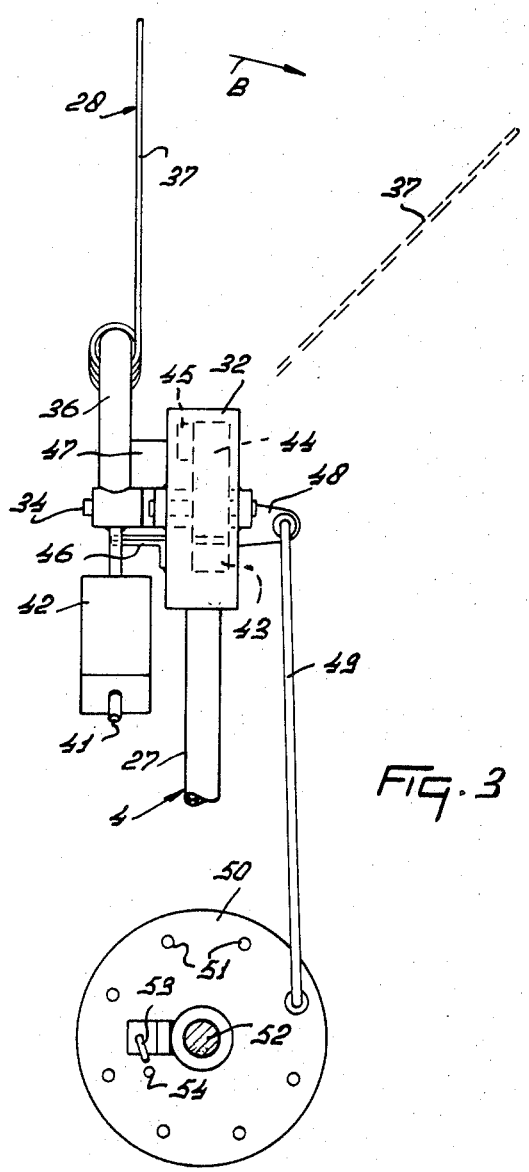
FIG. 3 is a plan view in the direction of the arrows III-—III in FIG. 2.

FIGS. 2 and 3 show schematically a first embodiment of the means 30 for one of the spokes 27, which is adapted to rotate about the rotary axis 31 of the rake wheel. The free end of the spoke 27 has pivoted to it a housing 32, which is pivotable about an upwardly extending pivotal axis 33. The housing 30 comprises part of a substantially horizontal pivotal axis 34, journalled in said housing and being tangential to the circumference of the rake wheel, and a second pivotal axis 35, located above the former and extending parallel to said pivotal axis 34. A tine support 36 is pivotable about the pivotal axis 34 and is bent through about 120°. In this embodiment this bent-over portion 36A has secured to it two tines made from a single length of steel wire by means of turns 39 and 40, which surround the bent-over portion 36A of the support 36. In line with the portion of the support 36 located near the pivotal axis 34 an arm 41 is arranged on the other side of the pivotal axis 34, said arm holding a mass 42. On plan the support 36 and the arm 41 extend at right angles to the pivotal axis 34 (see FIG. 3) and are located outside the housing 32. The housing 32 holds a cylindrical disc 43, journalled on the pivotal axis 34, which disc, according as it is serrated or smooth, is in mesh or in contact respectively with an element 44, adapted to turn about the pivotal axis 35. The element 44 shown comprises in this embodiment a radial arm 44A and an annular element secured to the outer end of said arm and extending concentrically with the pivotal axis 35 through a circumferential angle of about 90° and forming part of the cylindrical surface of the element. Near the junction between the radial arm 44A and the ring segment a mass 45 is secured to the element 44. The parts 43, 44 and 45 are enclosed by the housing 32. On the outer side of the housing, on the side of the support 36 and the arm 41, two stops 46 and 47 are provided.

On the bottom side of the housing an arm 48 extends on the rear side of the housing at right angles to the plane of the drawing in FIG. 2 (see also FIG. 3). The arm 48 has a hole receiving one end of a rod 49. The other end of the rod 49 is inserted into one of a plurality of holes 51 in a disc 50. The disc 50 is adapted to turn about the rotary axis 31 and to be fixed in a plurality of positions relative to an axis 52 holding the ground wheels 15 and 16 respectively by means of a spring-controlled locking pin 53, which is located in one of the two holes 54.

The automatic adjustment of the tines from the working position into the transport position and conversely is performed as follows. The mass 42 is arranged on the arm 41 at such a place that the mass of the structure of the support 36, the tines 37 and 39 with the turns 39 and 40 respectively, the arm 41 and the mass 42 is in indifferent equilibrium under the action of inertia forces operating in a given direction with respect to the pivotal axis 34. This is true when the center of gravity of said parts is located on the pivotal axis 34 in a plane normal to the pivotal axis 34. Not only when the rake wheel is standing still, in which case only the force of gravity has an accelerating effect, but also in the case in which the rake wheel is rotating and consequently centrifugal forces are active, the position once occupied by the parts 36 to 42 does not tend to change under said conditions.

The disc 43 may have circumferential teeth which are in mesh with teeth provided on the outer periphery of the element 44, but the two peripheries may alternatively be provided with depressed axial ridges or with frictional material. The latter is advantageous when the disc 43 and the element 44 are made, for example, of armoured synthetic resin. It will be obvious that these peripheries may also be conical.

In operation, when the rake wheel is rotating, the tines 37 and 38 extend outwardly and are inclined downwardly. This position is shown in FIG. 2 by solid lines. The parts 36 to 42 are then subjected to a complexity of of centrifugal forces normal to the rotary axis 31 and forces normal to the ground due to the force of gravity. As stated above the position shown of the parts 36 to 42 is not affected by these forces, since the center of gravity of the mass of these parts is located on the pivotal axis 34. Under the action of said complex forces the mass 45 is in the position shown, the center of gravity of said mass being located, however, slightly below a plane going through the pivotal axis 35 and being orthogonal to the rotary axis 31. The distance of said center of gravity from said plane depends upon the number of rotations. When the speed of rotation of the rake wheel is reduced to zero, the movable mass 45 will move downwardly into the position 45A indicated in FIG. 2 by broken lines. The element 44 then turns about the axis 35 in anticlockwise direction, viewed in FIG. 2, and hence the disc 43, which is in mesh or in contact with the element 44, turns in clockwise direction so that the tines move into the positions 37A and 38A indicated by broken lines in FIG. 2. The latter position is the transport position, in which the diameter of the rake wheel is considerably smaller. When the rake wheel is caused to rotate again, the mass 45 swings again into the position indicated by solid lines, the element 44 turning the disc 43 until the tines re-occupy the working position. It should be noted that in principle the force exerted by the element 44 on the disc 43 during the adjustment of the tines is very slight and is mainly intended to overcome frictional resistance and to impart a rotational acceleration to the parts 36 to 42 around the pivotal axis 34. This force is slight because the parts 36 to 42 are in indifferent equilibrium with respect to the pivotal axis 34.

In the transport position shown in FIG. 2 the parts 36 to 42 have turned through an angle of about 150° out of the working position, whereas the mass 45 has turned through an angle of about 80°. The transmission ratio required for obtaining these angular displacements is obtained by proportional adaptation of radii of the outer surfaces of the element 44 and of the disc 43. The radius of the outer face of the element 44 is larger than that of the disc 43 with the desired angular ratio. The stop 46 limits the deflection of the support 36 in the transport position, whereas the stop 47 marks the lowermost position of the tines in the working state.

It should be noted that it may be advisable to turn the mass 45 from the lowermost position 45A indicated by broken lines into the working position through only 45°, instead of 80°, and to adapt the ratio between the radii of the disc 43 and of the element 44 accordingly. In this case the support 36 is vigorously urged against the stop 47 and will respond more slowly to an upward surge of the tines 37 and 38.

A common adjustment of all tines of one rake wheel from a position suitable for spreading crop into a position suitable for swath formation is allowed by the pivotal connection of the housing with the spoke so that it can turn about the shaft 33. By detaching the locking pin 53, turning the disc 50 with respect to the axis 52 and by re-inserting the locking pin into the other hole 54 all groups of tines 37, 38 are turned about the pivotal axis 33, since the rod 49 simultaneously turns the housing 32 by means of the arm 48. Obviously, each hole 51 in the disc 50 corresponds to an adjusting means associated with one of the spokes. The number of holes 51 is therefore equal to the number of spokes 27. With respect to the direction of rotation B the position shown in FIG. 3 by solid lines for the tines is the position suitable for the formation of swaths, whereas the position suitable for spreading crop is indicated by broken lines.

The pivotal axis 33 (FIG. 2) is at an angle of about 15° to the rotary axis 31 of the rake wheel so that the two axis diverge in an upward direction. During the transition from the position for raking or forming swaths to the crop spreading position the free ends of the tines automatically move a greater distance from the ground.

It will be apparent that the precautions taken for the automatic adjustment of the tines from the working position into the transport position and conversely are not affected by the precautions taken for the adjustment of the tines from a spreading position into a raking position.

In a second embodiment (FIG. 4) parts corresponding with those of FIGS. 1 to 3 are designated by the same reference numerals; one of the spokes 27 is shown, the outer end of which is provided with a tine support 55 with tines 56 and 57, which is adapted to turn about a substantially horizontal pivotal axis 58, which is tangential to the circumference of the rake wheel. An arm 59 is rigidly secured in place with respect to the support 55. The center line of the arm 59 is at an angle of about 120° to that of the support 55 and said arm is inclined outwardly and upwardly when the support 55 extends vertically downwards away from the pivotal axis 58. The outer end of the arm 59 has pivoted to it a rod 60 by means of a pivotal axis 61. From the pivotal axis 61 the rod 60 extends in the direction of the rotary axis of the rake wheel. The end of the rod 60 facing the rotary axis is provided with a mass 62 comprising a roller 63. The mass 62 and the roller 63 are adapted to turn in common about an axis 64 provided at said end of the rod 60. To the lower side of the spoke 27 is welded a plate 65, in which an elongated opening 66 is provided. The smallest dimension of the opening 66 is such that the roller 63, located in the opening 66, can roll in the longitudinal direction of the opening 66. The longitudinal center line of the opening 66 is preferably located so that the prolongation of said center line crosses the top side of the pivotal axis 58 at right angles, while said center line is always inclined upwardly away from the rotary axis of the rake wheel.

Figure 4:
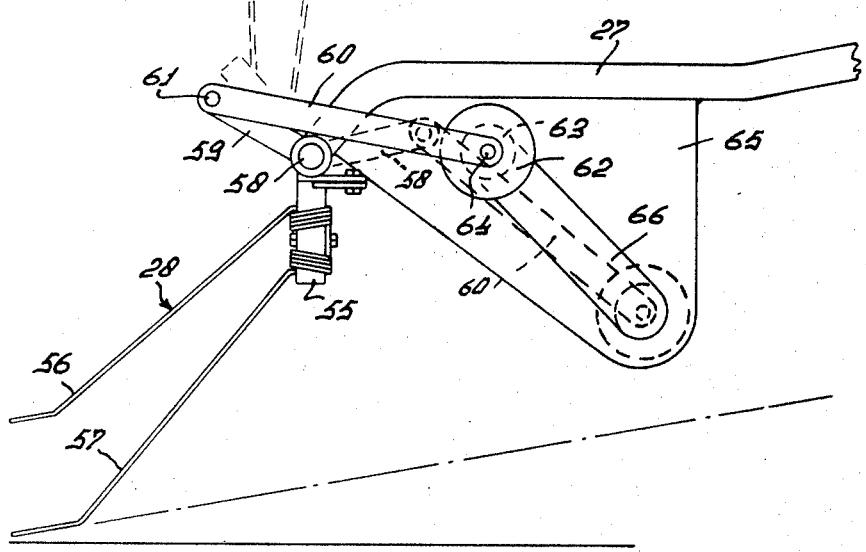
FIG. 4 is an elevation of a second embodiment of an automatic adjusting device for a group of tines, viewed in a horizontal direction at right angles to a spoke pointing forwardly in the direction of movement.

The position shown in FIG. 4 by solid lines for the support 55, the tines 56, 57, the arm 59, the rod 60 and the mass 62 is the working position. The magnitudes of the mass 62 and of the roller 63 are chosen so that the torque of the component of the weight of the mass 62 and of the roller 63, directed in the longitudinal direction of the center line of the opening 66 with respect to the pivotal axis 58 is higher, when the rake wheel is not rotating, than the (counter) torque of the weight of the support 55, the tines 56, 57 and the arm 59 in any possible turned position relative to the pivotal axis 58. When the rake wheel is not rotating said component of the weight of the displaceable mass 62 and of the roller 63 will move the latter towards the rotary axis of the rake wheel so that the support 55 and the tines 56, 57 move into the transport position indicated by broken lines 56A and 57A. When the rake wheel is rotating, the tines are deflected outwardly owing to the centrifugal force exerted on the support 55A and the tines and on the mass 62 and the roller 63. The ends of the opening 66 form the stops for the working position and the transport position. In the working position the support 55 and the tines 56, 57 are vigourously urged into said position.

Figure 5:
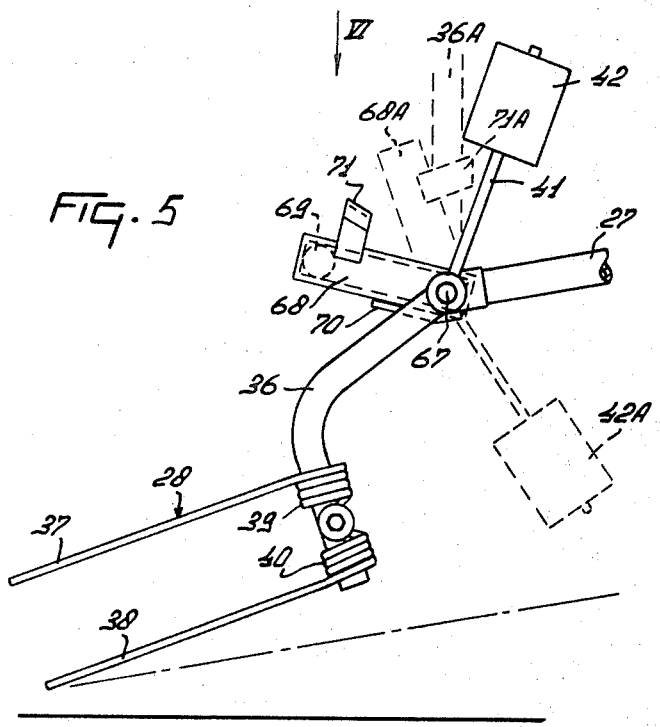
FIG. 5 is an elevation similar to that of FIG. 2 of a third embodiment of an automatic adjusting device for the tines.
Figure 6:
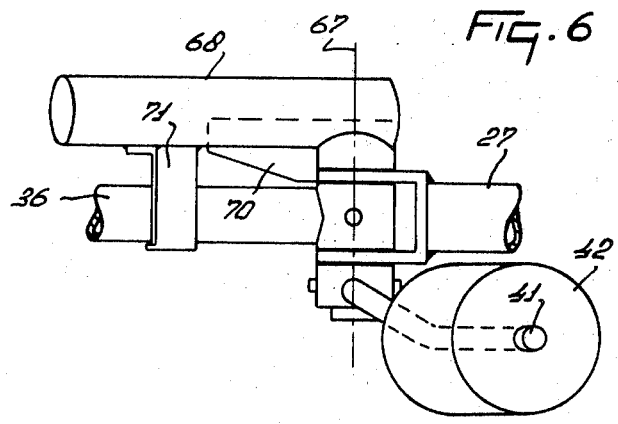
FIG. 6 is an enlarged plan view of the adjusting device of FIG. 5.

A third embodiment is shown schematically in FIG. 5 and 6. Parts corresponding with those of FIGS. 1 to 3 are designated by the same reference numerals. The rake member of this embodiment comprises at the end of a spoke 27 a pivotal axis 67, about which a support 36 with tines 37 and 38 with turns 39 and 40 respectively is adapted to pivot and an arm 41 and a mass 42 (similar to the construction shown in FIG. 2). In this embodiment the arm 41 is not in line with the part of the support 36 located near the pivotal axis 67, but it is at an obtuse angle to the latter.

A guide member formed by a tube 68 closed at both ends is freely pivotable about the pivotal axis 67. The tube 68 comprises a mass, for example, a ball 69, which is freely movable in the longitudinal direction of the tube 69. The lower side of the outer end of the spoke 27 has rigidly secured to it a stop 70, which limits a downward turn of the tube 68 so that, when the tube 68 is in contact with the stop 70, the tube is inclined upwardly and outwardly with respect to a plane normal to the rotary axis of the rake wheel. Near the top side of the tube 68 a stop 71 is located above or in front of the support 36, viewed on plan or in outward direction parallel to the spoke 27 respectively. In FIG. 5 the working position is shown by solid lines and the transport position of the parts 36 (36A), 42 (42A), 68 (68A) and 71 (71A) is indicated by broken lines. The mass of the pivotable parts 36 to 40 and 41, 42 is chosen so that, when the rake wheel is not rotating, these parts occupy the transport position indicated by broken lines. The weight of the parts 41 and 42 thus exerts a higher torque on the pivotal axis 67 than that of the parts 36 to 40. With this proportioning it should be considered that during an upward turn the support 36 carries along the tube 68 owing to the stop 71. The ball 69 is located at the end of the tube 68 near the pivotal axis 67 in the transport position.

When the rake wheel has attained a given speed of rotation, first the freely displaceable mass formed by the ball 69 will move towards the end of the tube 68 remote from the pivotal axis 67 owing to centrifugal force. The slope of the tube 68 in the transport position (designated by 68A) is, of course, chosen so that the ball effectively moves towards the last-mentioned end. This slope depends upon the centrifugal acceleration locally produced in the working position. Consequently, the ball moves away from the pivotal axis 67 and by means of the stop 71A its mass exerts an additional torque on the parts 36 to 40 and 41, 42 so that the assembly turns towards the working position. During this turn the tube 68 will touch the stop 70 and stay in the corresponding position wherein the tube extends obliquely upwardly and the ball 69 is disposed above a plane through the pivotal axis 67 and extending perpendicular to the axis of rotation of the rake wheel. In this position the mass 42 is located above the plane going through the pivotal axis 67 and being normal to the rotary axis, since the ends of the arms 36 and 41 facing the pivotal axis are at an obtuse angle to each other. The parts 36 to 40 and 41, 42 will thus turn further into the working position owing to the predominant centrifugal force exerted on the mass 42. The working position and also the transport position are limited by stops not shown in the Figures. It is desirable for the stop of the transport position to limit directly the movement of the stop 71A.

When the rake wheel stops, the ball 69 has rolled towards the pivotal axis 67, after which the effect of the mass 42 predominates and the tines swing into the transport position.

Figure 7:
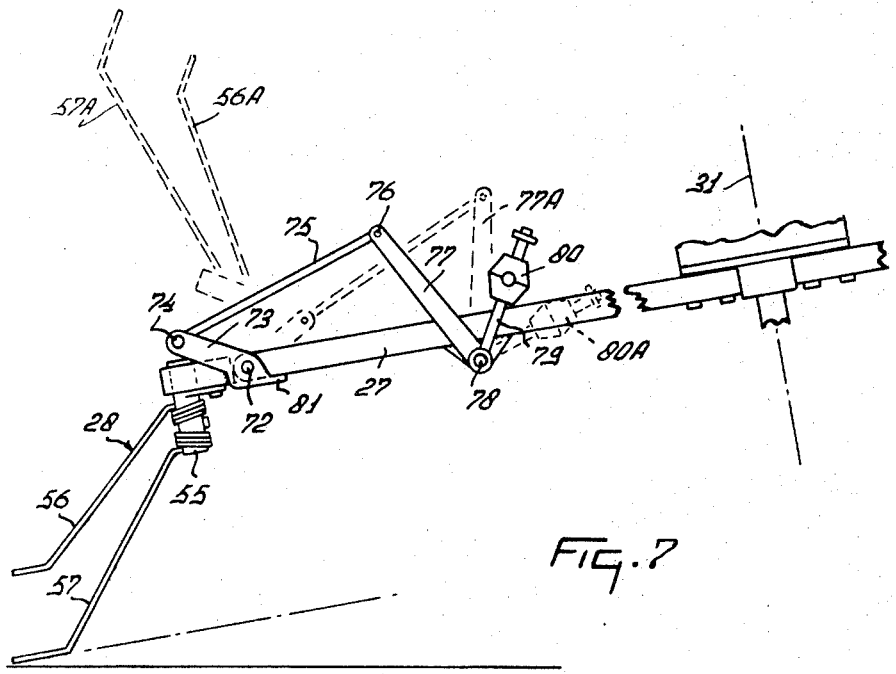
FIG. 7 is an elevation similar to that of FIG. 2 of a fourth embodiment of an automatic adjusting device for the tines.

FIG. 7 shows schematically a further embodiment, in which parts corresponding with those of FIGS. 1 to 3 are designated by the same reference numerals. In the rake member in this embodiment the tine support 55 with the tines 56 and 57 is adapted to turn about a substantially horizontal pivotal axis 72 at the end of one of the radial spokes 27 remote from the rotary axis 31. An arm 73 is rigidly secured to the support 55 and is coupled with a rod 75 so as to be pivotable about a pivotal axis 74. The rod 75 is adapted to turn at its end remote from the pivotal axis 74 about a pivotal axis 76 and connected with an arm 77. The arm 77 is arranged on the spoke 27 so as to be pivotable about a pivotal axis 78, A jib arm 79 is rigidly secured to the arm 77 and holds a displaceable mass 80. The jib arm 79 is directed upwardly towards the rotary axis 31 in the working position shown by solid lines so that the mass 80 is located on the side of a plane going through the pivotal axis 78, at right angles to the straight spoke 27 and parallel to the rotary axis, where the rotary axis 31 is located. The pivotal axes 72, 74, 76 and 78 are parallel to each other.

The ratio between the lengths of the arms 73 and 77 between the pivotal axes 72, 74 and 76, 78 respectively is chosen so that, when the tine support turns about the pivotal axis 72 through an an angle of, for example, 120°, the jib arm 79 turns through an angle of, for example, about 60°. The transport position indicated by broken lines for the tines 56 (56A) and 57 (57A) and the jib arm 79 (79A) and the mass 80 (80A) is such that, viewed in a direction parallel to the rotary axis 31, the distance of the outermost tips of the tines from the rotary axis is less than 85 percent, preferably about 70 percent of said distance in the working position. These dimensions also apply to the further embodiments. In the transport position the direction of the jib arm 79 (79A) is such that this jib arm 79A and the mass 80A are located above a plane going through the pivotal axis 78 and being at right angles to the rotary axis 31. The arm 73 has secured to it a stop 81 which determines the working position relative to the spoke 27.

The magnitude of the mass 80 is chosen so that, when the rake wheel is not rotating, the tines 56 and 57 turn into the transport position 56A and 57A. When the rake wheel attains a given number of revolutions, the centrifugal force exerted on the mass 80A, which is located above a plane going through the pivotal axis 78 and being at right angles to the rotary axis, will turn the jib arm 79A in the direction towards the working position. The tines thus swing into the working position. The transport position and hence the location of the mass 80A is determined by a stop (not shown).

Figure 8:
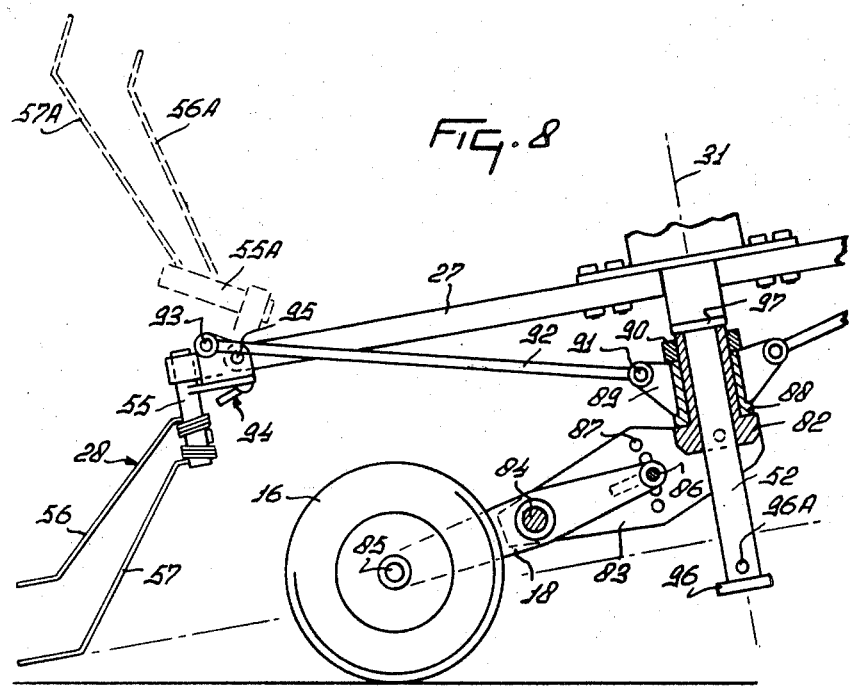
FIG. 8 is a corresponding elevation of a fifth embodiment of an automatic adjusting device for the tines.

The embodiment shown in FIG. 8 is partly designated by the same reference numerals. This Figure shows part of a rake wheel forming part of a spinning hay-making machine hitched to the threepoint lift of a tractor 10. The axis 52 located around the rotary axis 31 of the rake wheel and being stationary in operation and provided on the lower side with a shoulder 97 projects on the lower side of the rake wheel and is surrounded by a sleeve 82 adapted to slide in the axial direction of the axis 52 and having secured to it a jib arm 83, which projects to the front in the direction of travel A. Near the front end of the jib arm 83 the support 18 is adapted to turn about a horizontal pivotal axis 84, extending transversely of the direction of travel A. The wheel support 18 projects to the front with respect to the pivotal axis 84 and is provided at said part with the rotary axle 85 of the rake member constructed in the form of a ground wheel, and behind the pivotal axis 84 it also projects, the hindmost part having a hole for receiving a pin 86. This pin 86 can furthermore be inserted into one of a plurality of holes 87 in the jib arm 83 so that the ground wheel 16 is pivotable in a direction of height with a given position of the sleeve 82 with respect to the axis 52 and hence with respect to the rake wheel.

The sleeve 82 is surrounded by a second sleeve 88, to which a plurality of ears 89 are secured. The number of ears 89 is equal to the number of spokes 27. The sleeve 88 is not slidable in an axial direction with respect to the sleeve 82 owing to a detachable closing ring 90, which is rigidly secured in operation with respect to the sleeve 82. The sleeve 88 is adapted to turn about the sleeve 82. Each of the ears 89 has secured to it a pivotal axis 91 and a rod 92 is adapted to turn about the pivotal axis 91. The end of the rod 92 remote from the pivotal axis 91 is adapted to turn about a pivotal axis 93 and is connected with a hinge portion 94. The hinge portion 94 is adapted to turn about the pivotal axis 95 and connected with the spoke 27. The pivotal axis 93 is located at a higher level than the pivotal axis 95 viewed in a plane at right angles to the rotary axis. The hinge portion 94 is provided with the downwardly directed tine support 55 with the tines 56 and 57. On plan the rod 92 is located at the side of the spoke 27. The structure shown in FIG. 8 applies to each of the spokes 27.

The position shown by full lines in FIG. 8 is the working position. The sleeve 82 is pushed upwardly owing to the weight of the rake wheel on the ground wheel 16 until it is in contact with the bottom side of an annular stop 97, secured to the axis 52. When the tines have to be moved into the transport position, the hay-making machine is lifted by means of the three-point lift of the tractor 10. The sleeve 82 then slides downwardly along the axis 52 under the action of the weight of the ground wheel 16, which forms part of the displaceable mass, down to the stop 96. Since the pivotal axis 91 then also moves downwardly with respect to the rake wheel, the hinge portions 94 of all spokes 27 turn around the pivotal axes 95 under the action of the rods 92 so that all tines 56 and 57 are turned into the transport positions 56A and 57A. When the spinning hay-making machine is again deposited on the ground, the sleeve 82 moves upwardly so that all tines automatically regain the working position.

Near the lower end of the axis 52 a hole 96A is provided therein. When the hay-making machine is lifted, the sleeve 82 can be fixed in the lowermost position (the tines being in the transport position) with respect to the axis 51 by means of a pin that can be inserted into a hole in the sleeve 82 and into the hole 96A. This position is suitable for storing the hay-making machine.

Figure 9:
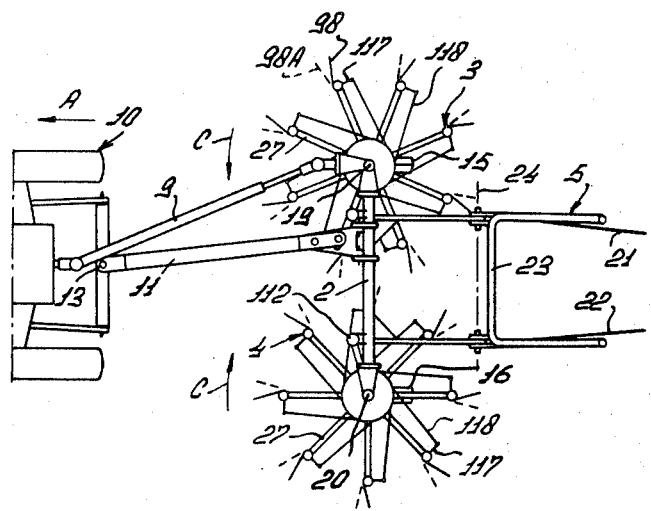
FIG. 9 is a schematic plan view of a spinning haymachine comprising an automatic adjusting device for the tines operating by the adjustment of a swath-forming device.
Figure 10:
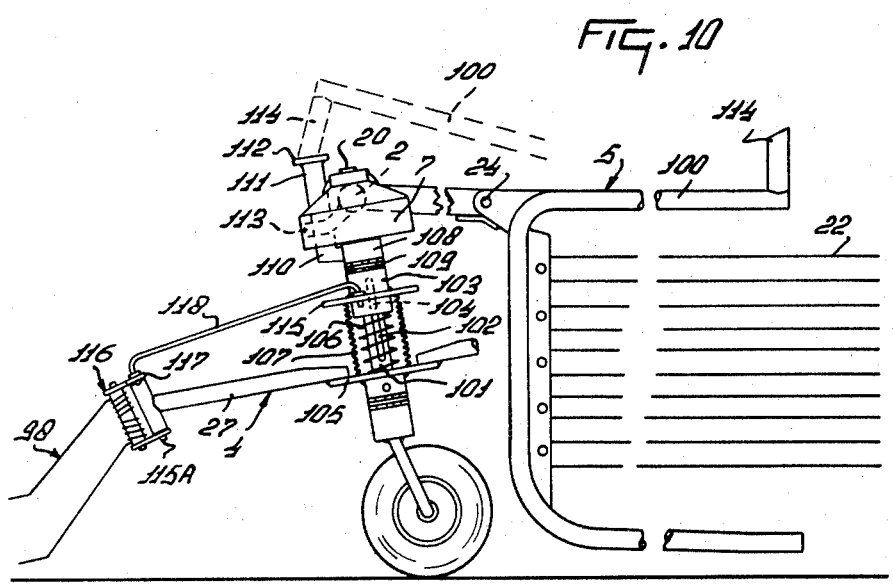
FIG. 10 is an enlarged side elevation of the spinning hay-machine in the direction of the arrow X of FIG. 9, a few spokes of a rake wheel being omitted for the sake of clarity.

The embodiment of a spinning hay-making machine shown in FIGS. 9 and 10 has automatic adjustment of all tines when the device 5 for the formation of an swath is displaced. Parts corresponding with those of FIGS. 1 to 3 are designated by the same reference numerals. The tines 98 of FIG. 9 are in the raking position, in which the device 5 (crop guiding member) is in the position for the formation of a swath.

The guide partitions 21 and 22 are formed by a plurality of substantially horizontal bars, clamped tight at the front and extending freely to the rear. These guide partitions are bounded over large part of their circumference by a rigid, tubular framework 100. As a matter of course, the guide partions may consist at least partly of sheet, cloth, gauze and the like.

The rotary axes 101 of the rake wheels 3 and 4 are provided with a milled key way 102. A sleeve 103 has an internal key 104 so that during the rotation of the axis 101 this sleeve slides in an axial direction along said axis. Between the lower end of the sleeve 103 and the hub 105 of the rake wheel 4 (FIG. 10) is arranged a spring 106. The axis 101 and the spring 106 are enclosed in depressible bellows 107, for example, of rubber for protecting the same from penetrating soil. Above the sleeve 103 the rotary axis 101 is surrounded by a ring 108, which is axially displaceable but which is not rotatable with respect to the frame of the hay-making machine. In operation the sleeve 103 rotates with respect to the ring 108. In order to avoid friction a ball bearing or a roller bearing 109 is arranged between the two parts. The ring 108 has secured to it a jib arm 110, which extends, on plan, radially away from the ring and which comprises a portion 111 parallel to the rotary axis of the rake wheel and having a stop face 112 on the top side. The part 111 is surrounded by a fork 113, rigidly secured to the frame. The fork 113 prevents a rotation of the ring 108 about the rotary axis, but it allows an axial displacement. The length of the portion 111 located between the top side of the fork 113 and the bottom side of the stop face 112 is equal to the length over which the spring 106 can be compressed.

The distance between the two stop faces 112, one of which is associated with the rake wheel 3 and the other with the rake wheel 4, is equal to the distance between the hindmost ends of the upper parts (see FIG. 10) of the framework 100 of the two guide partitions 21 and 22. The latter ends are provided with a stop 114, which extends upwardly at the rear end of the upper part of the framework 100.

The sleeve 103 is provided with a control-member formed by a ring 115, which is parallel to a plane at right angles to the center line of the rotary axis 101. The ring has a plurality of holes. Each of these holes corresponds to a group of tines 98 on one of the spokes. However, each hole is located on a different radial line than that coinciding with the center line of the spoke of the corresponding tine group 98. At the outer end of each spoke the tine group 98 is pivotally connected with an upwardly extending pivotal axis 115A (FIG. 10) arranged at an angle to the center line of the rotary axis 101. Near the top end of the pivotal axis 115A a tine support 116 for the tines 98 is provided with an arm 117 arranged at right angles to the pivotal axis 115A; said arm is shown schematically in FIG. 9. A connecting member formed by a connecting rod 118 is pivoted to the arm 117 and connected with ring 115 at the corresponding hole therein. In the topmost position of the ring 108 and the sleeve 103 with respect to the axis 101, in which the ring 108 is in contact with the lower side of the gear box 7, the rod 118 extends from the ring 115 in the direction of the arm 117 obliquely downwards, while the center line of the rod 118 is at an acute angle to the lower part of the center line of the rotary axis 101.

The construction shown in FIGS. 9 and 10 is that of a hay-making machine suitable for the formation of swaths. The guiding member 5 for the crop displaced by the rake wheels 3 and 4 is tilted down and guides the crop in the form of a swath. The tine groups 98 occupy the associated raking position and are in dragging position with respect to the direction of rotation C of the rake wheels. If this hay-making machine has to be employed for tedding or spreading crop, the swath forming device 5 is tilted up around the pivotal axis 24 so that the two stops 114 bear on the corresponding stop faces 112. Owing to the weight of the device 5 the jib arm 110 with the ring 108, guided by the fork 113, slides downwards along the axis 101, the sleeve 103 thus compressing the spring 116 and displacing it axially. Since the rod 118 is inclined downwardly and is pivoted at both ends, the arm 117 has to turn about the pivotal axis 115A. The support 116 is turned so that the tine group 98 is turned into the tedding position (98A), in which case the tines are pointing forwardly in the sense of rotation C. This movement applies to all tine groups 98. With this construction it is avoided that during the change-over of the machine from the swath-forming position to the tedding position and conversely all tine groups should have to be adjusted separately. If the machine has to be used again for the formation of swaths, it is only necessary to swing the device 5 back into the position shown in FIGS. 9 and 10 so that the spring 106 pushes upwards the sleeve 103 and the ring 108 and the tine groups 98 return to the raking position by means of the rod 118. Since the pivotal axis 115A is not parallel to the axis 101, it is automatically achieved during a change-over to the tedding position, that the distance of the ends of the tines from the ground is increased in the tedding position.

It will be apparent that the change-over of the tine groups 58 with the aid of the rod 118 may be carried out in different ways, for example, by arranging the sleeve 103 on a screwthread on the axis 101 so that during an axial displacement with respect to the axis 101 the sleeve will turn. In this case the rod 118 need not be inclined in position.

When the guide member or at least part thereof can be moved around an upwardly extending shaft with respect to the frame 2 of the hay-making machine from the swathforming position to the tedding position, the change-over may be carried out by simple lever transmission in which the sleeve 103 is displaced axially and-/or turned.

In the preceding embodiments the invention is explained with reference to the rake wheels of a hay-making machine, comprising tines projecting outwardly in operation, It will be apparent that the invention can also be applied, when the tines are mainly directed downwardly in operation and/or the pivotal shaft of the groupes of tines extends substantially radial. The constructions shown in FIGS. 1 to 8 may, if desired, also be used in the embodiments shown in FIGS. 9 and 10.

The invention is not restricted to what is stated in the specification and/or in the claims, it also relates to the details of the Figures whether described or not described.

We claim:

1. A raking device comprising a frame and at least one rake member mounted on said frame to rotate about an upwardly extending axis, said rake member having tines mounted on pivotable arm means and movable in a circular path around said upwardly extending axis, said tines being pivotable to several different positions including at least one crop working position, a displaceable, weighted mass pivotably connected to said frame and indirectly coupled to said rake member, said mass being displaceable to a location which pivots said tines away from a working position and said mass being a guide member for crop displaced by said rake member, said guide member being pivoted to the rear of said frame.

2. A device as claimed in claim 1, wherein said tines are moved from a tedding position into a raking position when said guide member is pivoted upwardly relative to said frame.

3. A device as claimed in claim 1, wherein a spring is associated with said arm means to move said tines from a first working position to a second working position.

4. A device as claimed in claim 3, wherein an adjusting element is connected to said arm means and said mass is associated with said adjusting element to change the position of said element with respect to the rotary axis of the rake member.

5. A device as claimed in claim 4, wherein said adjusting element is a sleeve mounted for circular movement on said rotary axis.

6. A device as claimed in claim 5, wherein said adjusting element is axially displaceable along said rotary axis.

7. A device as claimed in claim 7, wherein said adjusting element is a ring on said sleeve.

8. A device as claimed in claim 7, wherein said spring is mounted on said rotary axis between the adjusting element and a lower stationary hub on said rake member.

9. A device as claimed in claim 8, wherein said tines are mounted on spokes in groups and each group is connected to said adjusting element by a connecting member whereby all of the tines are moved from one working position together.

10. A device as claimed in claim 9, wherein each group of tines is turnable about a pivotal axis with respect to said spokes.

11. A device as claimed in claim 10, wherein said connecting member crosses both the rotary axis of the rake member and the pivotal axes of the tines.

12. A device as claimed in claim 10, wherein said connecting member is a rod which extends at an angle to said rotary axis.

13. A device as claimed in claim 7, wherein the axial position of the adjusting element is determined by the position of a nonrotatable control-member on said rotary axis.

14. A device as claimed in claim 13, wherein said control-member is an axially displaceable sleeve which is displaceable along said rotary axis.

15. A device as claimed in claim 7, wherein said guide member is turnable about a substantially horizontal pivotal axis on said frame.

16. A device as claimed in claim 15, wherein said guide member can be moved upwardly with respect to said frame from a swath-forming position into a tedding position.

17. A device as claimed in claim 16, wherein said guide member is pivotally linked to said frame whereby a leverage connection is achieved with said adjusting element relative to said rotary axis and the positions of said tines are automatically changed.

18. A device as claimed in claim 1, wherein said tines are directed outwardly in a working position and pivotable upwardly to a transport position.

19. A device as claimed in claim 1, wherein all of the tines of said rake member are movable simultaneously from a working position to a tedding position responsive to the displacement of said mass.

20. A device as claimed in claim 19, wherein said rake member is a wheel having a hub and an adjusting device for changing the positions of the tines is located at least partly inside the circumference of said hub, viewed in the direction of the rotary axis of said rake member.

21. A device as claimed in claim 20, wherein said adjusting device is mounted to surround the rotary axis of said rake member.

22. A device as claimed in claim 21, wherein said adjusting device has an annular shape and is turnable about the rotary axis of the rake member.

23. A device as claimed in claim 22, wherein each tine is coupled with said adjusting device by a rod.

24. A device as claimed in claim 21, wherein said adjusting device is turnable about the rotary axis of the rake member and has locking means to fix the tines in a plurality of positions.

25. A raking device comprising a frame and at least one rake member mounted on said frame to rotate about an upwardly extending axis, said rake member having tines positioned to travel a circular path and work crop on the ground during operation, said tines being connected to said rake member with pivot means and operatively associated with a displaceable weighted mass on said device which is interconnected to said pivot means, said tines being turnable from a first position about said pivot means to a second and different position responsive to the movements of said mass, said tines being secured to supports on said rake member and each support being turnable about a pivotal axis, the center of gravity of said tines and supports being located approximately on said pivotal axis, said mass and a group of tines being connected with sleeve means on the axis of rotation of the rake member, said sleeve means being turnable about said axis of rotation to adjust the positions of the tines and a driving connection being located between said mass and tines.

26. A device as claimed in claim 25, wherein said sleeve means includes a plurality of sleeves which are cylindrical bodies that surround said axis of rotation.

27. A device as claimed in claim 25, wherein said rake wheel is supported by a ground wheel mounted on said axis, said ground wheel forming at least a part of said weighted mass.

28. A device as claimed in claim 27, wherein stop means is mounted on said frame and the movement of said mass in an upward direction is limited by said stop means.

29. A device as claimed in claim 28, wherein the downward movement of said mass is limited by a lower stop of said stop means.

30. A device as claimed in claim 25, wherein a coupling member is attached to said frame and the latter includes a supporting member which holds said tines in a transport position when said device is raised.

31. A device as claimed in claim 30, wherein said supporting member is displaceable with respect to the rotary axis of said rake member and the downward displacement of the supporting member moves said tines from a working position to a transport position.

32. A device as claimed in claim 30, wherein stop means is mounted on said axis and said supporting member is movable and fixable in several positions relative to said stop means.

33. A raking device comprising a frame and at least one rake member mounted on said frame to rotate about an upwardly extending axis, said rake member having tines positioned to travel a circular path and work crop on the ground during operation, said tines being connected to said rake member with pivot means and at least one tine being operatively associated with a displaceable weighted mass on said device, said weighted mass cooperating with said tine and being totally displaceable as a whole relative to the tine and said tine being turnable from a transport position about said pivot means to a working position as well as from a working position to a transport position responsive to the displacement movements of said mass relative to said tine.

34. A device as claimed in claim 33, wherein the tines are secured to supports of said rake member, and each support is turnable about a horizontal pivotal axis, the center of gravity of said tines and supports being located approximately on said pivotal axis.

35. A device as claimed in claim 33, wherein said tines are in groups and each group of tines is connected to its respective weighted mass and is turnable about at least one pivotal axis, an adjusting device being linked with each mass to vary its effect on the group of tines to which it is connected.

36. A device as claimed in claim 35, wherein viewed in a direction parallel to the rotary axis of said rake member, the center of gravity of each group of tines, its weighted mass and adjusting device is located between said pivotal axis and said rotary axis.

37. A device as claimed in claim 36, wherein said rake member comprises a guiding member and said displaceable mass is movable towards said rotary axis along a non-closed path and along a substantially straight line.

38. A device as claimed in claim 36, wherein said mass is turnable about an axis which intersects the rotary axis of said rake wheel at substantially right angles.

39. A device as claimed in claim 38, wherein the direction of movement of said mass is at an angle to said rotary axis.

40. A device as claimed in claim 38, wherein the center of gravity of said mass is located above the plane going through its turnable axis and at right angles to said rotary axis of the rake member in a working position and in a transport position.

41. A device as claimed in claim 33, wherein a turn of said displaceable mass through a given angle moves said tines through a larger angle.

42. A device as claimed in claim 33, wherein, with respect to a pivotal axis of said pivot means, said mass is freely movable in a radial direction.

43. A device as claimed in claim 42, wherein said mass is contained and freely movable in an axial direction in an enclosed guiding member.

44. A device as claimed in claim 43, wherein said guiding member and mass are movable about a horizontal axis.

45. A device as claimed in claim 44, wherein said guiding member is movable with respect to said tines between two spaced apart stops on said rake member.

46. A device as claimed in claim 33, wherein said mass is displaceable in a straight path and direction parallel to the rotary axis of said rake member.

47. A device as claimed in claim 33, wherein there are two side-by-side rake members which are mounted on a beam of said frame to rotate in opposite directions.

48. A device as claimed in claim 33, wherein said weighted mass and said tines are independently rotated during operation and interconnected to be moved towards said working position by centrifugal force on said weighted mass.

49. A device as claimed in claim 33, wherein said tines are turnable from a transport position to a working position by an outward movement of the center of gravity of said mass relative to said tine.

* * * * *